(No Model.)
D. J. AMES.
MILLSTONE OR MILL PLATE DRESS.
No. 382,747. Patented May 15, 1888.
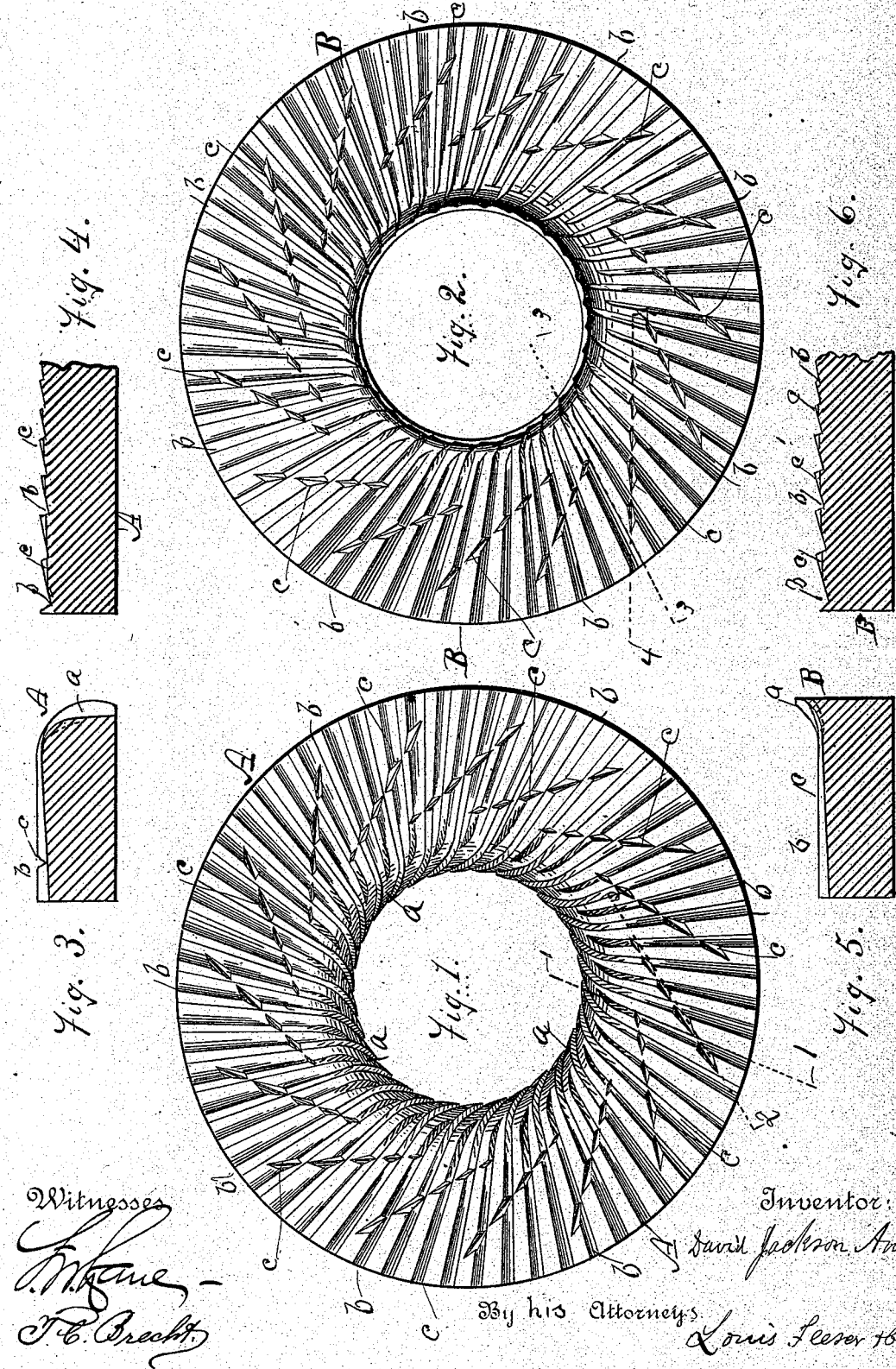

UNITED STATES PATENT OFFICE.

DAVID JACKSON AMES, OF OWATONNA, MINNESOTA.

MILLSTONE OR MILL-PLATE DRESS.

SPECIFICATION forming part of Letters Patent No. 382,747, dated May 15, 1888.

Application filed May 9, 1887. Serial No. 237,571. (No model.)

*To all whom it may concern:*

Be it known that I, DAVID JACKSON AMES, a citizen of the United States, residing in Owatonna, in the county of Steele and State of Minnesota, have invented certain new and useful Improvements in Millstone or Mill-Plate Dress for Cotton-Seed and Grain Hulling or Reducing Machines; and I do hereby declare that the following is a full and exact description of the same, reference being had to the accompanying drawings, making part of this specification.

In the accompanying drawings, Figure 1 represents a face view of one of the hulling or reducing disks or plates constructed with my improvements; Fig. 2, a face view of the other hulling or reducing plate constructed with my improvements; Fig. 3, a section of the plate, Fig. 1, in a plane indicated by the line 1 1, Fig. 1; Fig. 4, a section of the same in a plane indicated by the line 2 2, Fig. 1; Fig. 5, a section of the plate, Fig. 2, in a plane indicated by the line 3 3, Fig. 2; Fig. 6, a section of the same in a plane indicated by the line 4 4, Fig. 2.

Like letters designate corresponding parts in all the figures.

These disks are constructed to be used either in a horizontal or vertical position, and either may revolve and the other be stationary, or both may revolve; also they may be used with various constructions of machines; but I shall herein describe the disks or plates as used in machines of the construction represented and described in Letters Patent No. 352,285, granted to me November 9, 1886, and in similar relation to the disks or plates shown and described in Letters Patent No. 226,152, granted to me and Ezra Jasper Ames April 6, 1880.

The disk or plate A, Fig. 1, may here be considered the stationary plate and as corresponding to the disk or ring $B^3$, described in the aforesaid Letters Patent No. 352,285. My improved construction of this disk or plate is as follows: First, it has deep-cut grooves or furrows $a\ a$, near the inner edge or eye, which may connect with feed grooves or furrows such as are represented and marked $a^2$ in the lower feed-hopper in the said Letters Patent No. 352,285. Next, commencing at the outer extremities of these grooves, a set of finer-cut grooves or furrows, $b\ b$, extend outward to the periphery of the disk or plate, similar to the corresponding grooves described in the above-mentioned Letters Patent No. 226,152, both sets of grooves being tangent to a small circle concentric with the disk or plate. These grooves or furrows are made gradually deeper and generally wider from the inner ends outward to the periphery of the disk or plate, as shown in Fig. 3, for the purpose of making the discharge more free than the receiving end, and thus preventing the disk or plate from becoming clogged, choked, or gummed up while the seed or grain is being ground or crushed in passing outward between the two disks. Finally, another set of grooves or furrows, $c\ c$, are cut across the grooves or furrows $b\ b$, tangential to a larger circle than the latter-named grooves or furrows, but inclined in the same direction, thus crossing them obliquely. These cross-grooves aid in the free discharge of the seed or grain while being hulled, crushed, or ground. They also divide the grooves or furrows $b\ b$ into two or more parts, and thereby prevent the seed or grain from passing out between the disks or plates without being broken or crushed, as required. These grooves or furrows $c\ c$ also are cut deeper as they approach the outer edge of the disk or plate, as shown in Fig. 4, for the purpose of making the discharge of the ground or hulled seed or grain still greater than the receiving capacity at the inner ends, to prevent choking or clogging.

The disk or plate B, Fig. 2, may be considered the rotating disk or plate, and corresponding with the disk or ring $B^9$ in the said Letters Patent No. 352,285. The construction is similar to that of the disk or plate A, except that it is somewhat concave next to the inner edge, so that it may connect with tangential wings, as $c$, (shown and described in the said Letters Patent No. 226,152,) which wings serve as distributers to move the seed or grain out of the finer grooves or furrows $b$ $b$ and $c\ c$, and thus greatly increase the capacity of the machine. The grooves $b\ b$ in this disk or plate increase in depth (and preferably also in width) outward to the edge of the disk or plate, as shown in Fig. 5, like the corresponding grooves or furrows in the disk or plate A; and likewise the cross-tangential grooves or furrows $c\ c$ similarly increase in depth outward, as shown in Fig. 6, as in the other disk or plate and for the same purpose.

I claim as my invention—

1. A disk or plate for cotton-seed and grain hulling and reducing machines having grooves or furrows tangential to a small circle around the center thereof, commencing at about the outer margin of the curved portion around the eye and regularly increasing in depth from the inner ends to the periphery of the disk or plate, and other grooves or furrows tangential to a larger circle than the first-named grooves or furrows and crossing the same obliquely, extending from near the outer margin of the said curved portion around the eye nearly to the periphery of the disk or plate and increasing in depth from the inner to the outer ends, substantially as herein set forth.

2. A disk or plate for cotton-seed and grain hulling and reducing machines having deep-cut grooves in the curved portion around the eye, in combination with finer grooves or furrows tangential to a small circle around the center thereof, the said finer grooves or furrows commencing at about the outer terminations of the deep grooves and regularly increasing in depth from the inner ends to the periphery of the disk or plate, and other grooves or furrows tangential to a larger circle than the said finer grooves or furrows and crossing the same obliquely, extending from points near the outer margins of curved portions around the eye nearly to the periphery of the disk or plate and increasing in depth from the inner to the outer ends, substantially as herein set forth.

In testimony whereof I have hereunto set my hand in presence of two subscribing witnesses.

DAVID JACKSON AMES.

Witnesses:
J. R. PHEENEY,
C. N. McLAUGHLIN.